J. F. McELROY.
ELECTRIC HEATER.
APPLICATION FILED AUG. 18, 1913.
1,227,637.
Patented May 29, 1917.
2 SHEETS—SHEET 1.
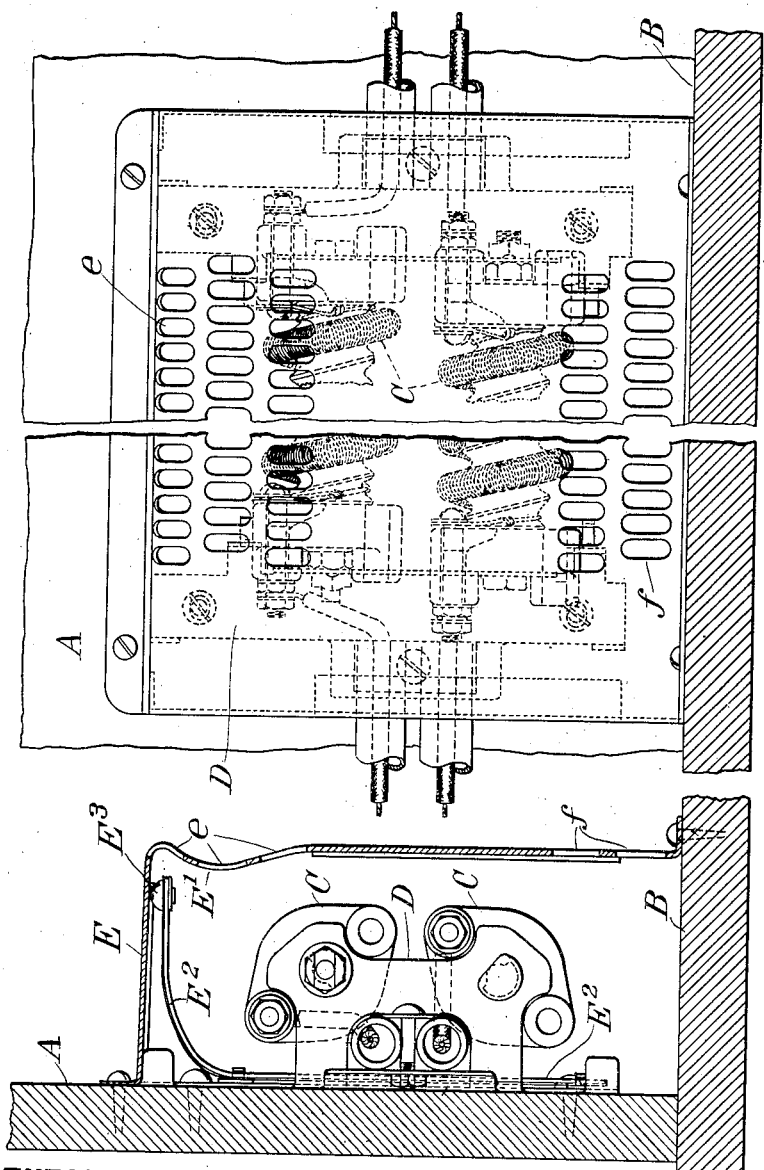
WITNESSES:
INVENTOR
James F. McElroy
BY
E. M. Brittly
ATTY.

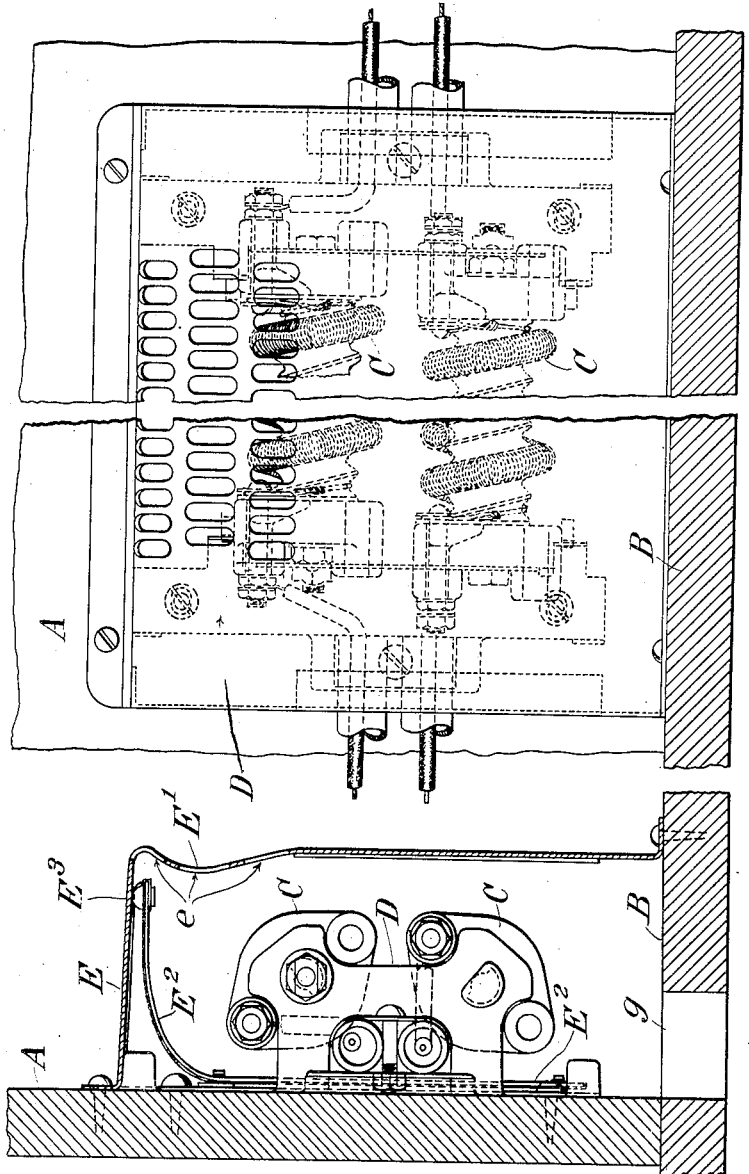

UNITED STATES PATENT OFFICE.

JAMES F. McELROY, OF ALBANY, NEW YORK, ASSIGNOR TO CONSOLIDATED CAR-HEATING COMPANY, A CORPORATION OF WEST VIRGINIA.

ELECTRIC HEATER.

1,227,637.　　　　Specification of Letters Patent.　　Patented May 29, 1917.

Application filed August 18, 1913. Serial No. 785,407.

*To all whom it may concern:*

Be it known that I, JAMES F. McELROY, a citizen of the United States, residing at Albany, county of Albany, State of New York, have invented certain new and useful Improvements in Electric Heaters, the following being a full, clear, and exact disclosure of the one form of my invention which I at present deem preferable.

For a detailed description of the present form of my invention, reference may be had to the following specification and to the accompanying drawings, which illustrate my invention, wherein—

Figure 1 is a front elevation of my improved electric heater;

Fig. 2 is a vertical transverse section thereof, and

Figs. 3 and 4 are corresponding views of a modified form.

My invention relates to an electric heater for cars, and it includes a heating element of any suitable type provided with a standard or support by which it may be secured in position adjacent to a vertical wall within the car, such as the truss-plank extending along the car side, but spaced outwardly therefrom. Such heating element is moreover inclosed by an angular casing arranged to be separately secured in place against the said wall in such a manner as to project forward therefrom and inclose the heater. This angular casing is so constructed that it may serve at the same time as a foot rest, and for that purpose it is made of substantial sheet metal and is also curved inward near its upper front corner to give additional strength and also to provide a reëntrant portion in which the perforations for the escape of the heat are formed. Within the casing and above the heating element I arrange a reflector plate separated a slight distance from the vertical wall near which the heating element is secured and projecting forward toward the perforations aforesaid for directing the heated air outward into the car; while it is furthermore insulated from the top side of the casing by means of insulating buttons in order that the said top wall may remain cool enough to be used as a foot rest without burning the shoe.

Referring to the accompanying drawings, A represents the truss-plank of a car and B the floor plank thereof. C C represent an electric heating element of any suitable kind, the same being provided with end supports D with lateral projections extending to the truss-plank A and separately secured thereto, whereby the heating element is projected away from the truss-plank a sufficient distance to avoid undue heating thereof. E represents an angular casing having a horizontal portion directly above the heating element and a vertical portion in front thereof. The casing E is arranged to be secured to the truss-plank A and the floor B independently of the heating element. By this means the heating elements may be secured in position along the side of the car and their electrical connections made and tested without interference from the angular casing, which may be placed subsequently and separately in position to inclose the said elements. $E^2$ is a sheet metal deflecting element separated a slight distance from the truss-plank A and having its upper end curved slightly forward toward the right-hand corner of the angular casing, and near its outer edge it is provided with buttons $E^3$, of porcelain or other insulating material, which serve to separate the front edge of the deflector from the top wall of the casing E. The surface of the deflector $E^2$ is preferably covered with asbestos on the side adjacent to the heater. The upper front corner of the angular casing E is provided with a reëntrant portion $E^4$ which serves to stiffen the casing to allow for its being used as a foot rest, and is also perforated with openings $e$ through which the air heated by the heating element may be delivered into the car. By placing the perforations in this reëntrant portion of the casing I largely prevent the entrance of dust and dirt. The air to be heated by the heating element may enter the casing through the perforations $f$ in the lower portion of the front wall of the casing; but in many cases I prefer the arrangement shown in Figs. 3 and 4, which is the same as that appearing in Figs. 1 and 2, except that the aforesaid perforations $f$ are omitted and the air is introduced into the casing through an opening $g$ in the floor of the car. In operation the cold air which enters the casing will become heated by the heating element and in passing upward will be deflected by deflector $E^2$ and flow out through the openings e into the car. At the same time the casing E will itself remain cool, being protected by the deflector E², which, moreover, receives more or less air along its rear surface where it is separated from the truss-plank A, and also on its upper side where the air passes forward between the deflector and the top wall of the casing and goes out through the upper line of perforations e. By this means the casing E may be safely used as a foot rest without danger of burning the shoes of passengers.

What I claim as new and desire to secure by Letters Patent is:

1. In an electric heater the combination with a heating element provided with means whereby it may be attached to a support, of a casing having a top wall, a front wall and end walls, said casing being open at the top and bottom, the rear edge of the top wall and the bottom edge of the front wall having means whereby the casing may be attached to angularly disposed supports in a position to inclose said heating element, and means for providing a circulation through said casing.

2. A side wall electric heater comprising a casing having a top wall, a front wall and end walls, said casing being open at the back and at the bottom, the top wall being imperforate to act as a foot rest, the rear edge of the top wall and the bottom edge of the front wall being provided with outturned attaching flanges, and a heating element located within the casing and supported independently thereof, the front wall of the casing having perforations for the ingress and egress of air.

In witness whereof I have hereunto set my hand before two subscribing witnesses, this 14th day of August, 1913.

JAMES F. McELROY.

Witnesses:
HERBERT A. CAULKINS,
CLARENCE PALMER.